United States Patent [19]

Owen

[11] Patent Number: 5,375,065
[45] Date of Patent: Dec. 20, 1994

[54] WAVEFORM GENERATORS USING DIGITALLY GENERATOR SUPERIMPOSED WAVEFORMS

[75] Inventor: David P. Owen, Dunstable, England

[73] Assignee: Marconi Instruments Limited, Hertfordshire, United Kingdom

[21] Appl. No.: 931,150

[22] Filed: Aug. 17, 1992

[30] Foreign Application Priority Data

Aug. 16, 1991 [GB] United Kingdom ............ 9117747

[51] Int. Cl.$^5$ .......................................... G06F 1/02
[52] U.S. Cl. ......................... 364/480; 364/721; 307/106; 340/952; 327/107
[58] Field of Search ........... 364/480, 487, 559, 424.01, 364/424.02, 424.06, 428, 432, 433, 718, 719, 720, 721; 307/3, 106, 529, 350, 264; 331/182, 183; 340/947, 951, 952; 342/33-35, 128-130

[56] References Cited

U.S. PATENT DOCUMENTS

| | | | |
|---|---|---|---|
| 4,024,385 | 5/1977 | Richards | 364/721 |
| 4,524,326 | 6/1985 | Larson | 307/529 |
| 4,630,217 | 12/1986 | Smith et al. | 364/480 |
| 4,695,804 | 9/1987 | Bardl et al. | 307/529 |
| 4,773,022 | 9/1988 | Melville et al. | 364/487 |
| 4,992,743 | 2/1991 | Sheffer | 364/718 |
| 5,038,141 | 8/1991 | Grove | 364/433 |
| 5,126,960 | 6/1992 | Thong | 364/721 |
| 5,153,587 | 10/1992 | Redlich | 340/947 |
| 5,303,417 | 4/1994 | Laws | 307/529 |

*Primary Examiner*—Emanuel T. Voeltz
*Assistant Examiner*—Kyle J. Choi
*Attorney, Agent, or Firm*—Kirschstein, Ottinger, Israel and Schiffmiller

[57] ABSTRACT

A waveform generator suitable for use in the testing of instrument landing systems comprising: a first generator (1) for generating digitally a first waveform comprising the superposition of a second waveform (19) of a first frequency and a third waveform (21) of a second frequency; a second generator (3) for generating digitally a fourth waveform comprising the superposition of a fifth waveform (25 or 27) comprising a phase reversed version of one (19 or 21) of said second (19) and third (21) waveforms of the frequency of said one waveform (19 or 21) and a sixth waveform (23 or 29) in phase with and of the frequency of the other one (19 or 21) of said second (19) and third (21) waveforms; and a circuit (7) for combining said first and fourth waveforms thereby to produce a waveform suitable for said use.

11 Claims, 2 Drawing Sheets

WAVEFORM GENERATORS USING DIGITALLY GENERATOR SUPERIMPOSED WAVEFORMS

BACKGROUND

This invention relates to waveform generators.

More particularly the invention relates to waveform generators suitable for use in the testing of instrument landing systems (ILSs).

An ILS is a system which is capable of guiding an aircraft in blind flying conditions to land. The system comprises ground based transmitters which transmit two pairs of beams which overlap to define a narrow pencil landing flight path, and an aircraft based receiver. One beam of each pair comprises a radio frequency (rf) carrier amplitude modulated with a frequency of 90 Hz. The other beam of each pair comprises an rf carrier amplitude modulated with a frequency of 150 Hz. In each pair of beams the depth of the 90 Hz amplitude modulation is the same as the depth of the 150 Hz amplitude modulation, i.e. the amplitude of the 90 Hz modulating waveform is the same as the amplitude of the 150 Hz modulating waveform. One pair of beams defines the verticle angle of approach (glide path). The other pair of beams defines the horizontal angle of approach (direction of approach).

If the aircraft is in the correct position with respect to both of the pairs of beams the receiver indicates in respect of each pair equal amounts of 90 Hz and 150 Hz modulation, i.e. indicates in respect of each pair that there is no difference in the depth of the 90 Hz and 150 Hz amplitude modulation (DDM). If the aircraft is not in the correct position with respect to either pair or both pairs of beams the receiver indicates a dominance in one frequency of modulation in one or each of the pairs of beams, i.e. indicates for one pair or for each pair that there is a DDM. The amount of the DDM for each pair indicates the extent to which the aircraft has moved off path. The system thereby guides the aircraft to land.

To test a receiver it is necessary to be able to generate a test waveform comprising the superposition of 90 Hz and 150 Hz waveforms of the same amplitude. It is also necessary to be able to generate test waveforms having various specified different amplitudes. In the testing, these waveforms are used to amplitude modulate the aforementioned rf carrier. The waveform wherein the 90 Hz and 150 Hz components are of the same amplitude can therefore be termed the zero DDM waveform, and the waveforms wherein the 90 Hz and 150 Hz components have different amplitudes termed non-zero DDM waveforms. It is important that the total amplitude is the same for all the test waveforms since in practice in the ILS when the aircraft moves off path although the DDM changes the total depth of modulation remains the same.

One prior art generator for generating such test waveforms comprises a direct digital synthesiser (DDS) comprising a digital accumulator, a PROM or RAM look-up table and a digital to analogue D/A converter. The look-up table stores 1/30 of a second of each of a number of alternatively selectable test waveforms to be provided (the zero DDM waveform and the non-zero DDM waveforms), it being sufficient to store 1/30 of a second of each since this is the repeating period of the test waveforms. The look-up table is addressed by the digital accumulator which determines the timing of the test waveform provided by the look-up table. The D/A converter converts into analogue form the selected test waveform provided by the look-up table.

A problem with this prior art generator is that for satisfactory operation for the generation of the zero DDM waveform and the various non-zero DDM waveforms very fine resolution and good linearity is required for the D/A converter. Further, it is inconvenient to store the many waveform in the look-up table.

SUMMARY OF THE INVENTION

It is an object of the present invention to provide an improved form of waveform generator.

According to the present invention there is provided a waveform generator suitable for use in the testing of instrument landing systems comprising: first generator means for generating digitally a first waveform comprising the superposition of a second waveform of a first frequency and a third waveform of a second frequency; second generator means for generating digitally a fourth waveform comprising the superposition of a fifth waveform comprising a phase reversed version of one of said second and third waveforms of the frequency of said one waveform and a sixth waveform in phase with and of the frequency of the other one of said second and third waveforms; and means for combining said first and fourth waveforms thereby to produce a waveform suitable for said use.

Preferably, the generator further comprises variable attenuator means for attenuating the amplitude of said fourth waveform and said means for combining comprises means for summing said first and fourth waveforms.

Preferably, said second and third waveforms have the same amplitude, said fifth and sixth waveforms have the same amplitude, and said first and second generator means each comprises direct digital synthesiser means including a digital to analogue converter whereby the output of the direct digital synthesiser means is in analogue form.

BRIEF DESCRIPTION OF THE DRAWINGS

A waveform generator in accordance with the present invention will now be described, by way of example, with reference to the accompanying drawings in which.

DESCRIPTION OF THE PREFERRED EMBODIMENT

Figure 1:
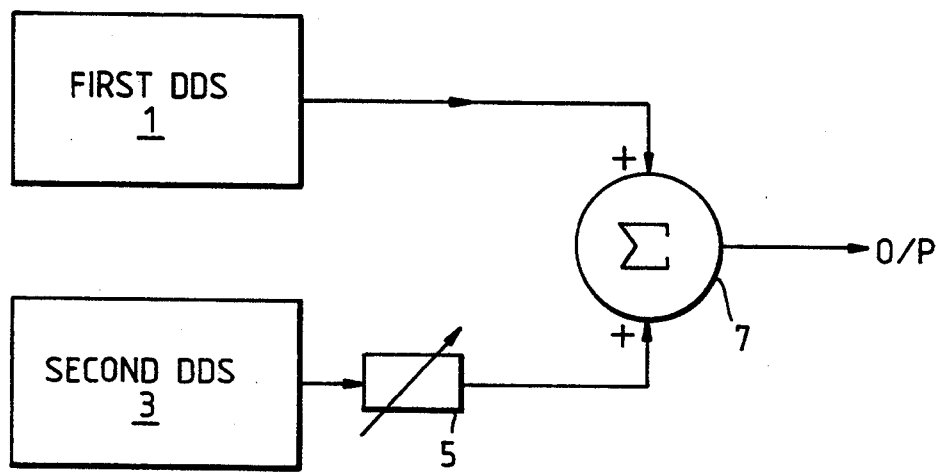
FIG. 1 is a block schematic circuit diagram of the waveform generator.

Referring to FIG. 1, the waveform generator comprises first and second DDSs 1, 3, a variable attenuator 5, and a summing circuit 7.

Figure 2:
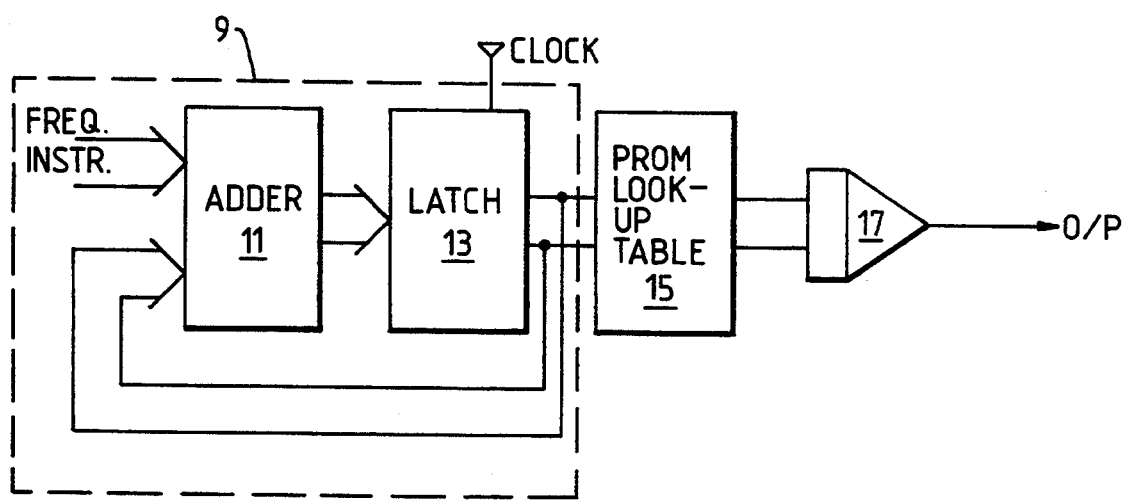
FIG. 2 is a block schematic circuit diagram showing in more detail parts of the circuit of FIG. 1.

Referring also to FIG. 2, the first and second DDSs 1, 3 each comprise a digital accumulator 9 comprising an adder 11 and a latch 13, a PROM look-up table 15, and a D/A converter 17. The adder 11 and latch 13 present a series of addresses to the look-up table 15 at a rate determined by the frequency instruction provided to the adder 11 to read out from the look-up table 15 in order digital values for constructing a waveform.

Figure 3:
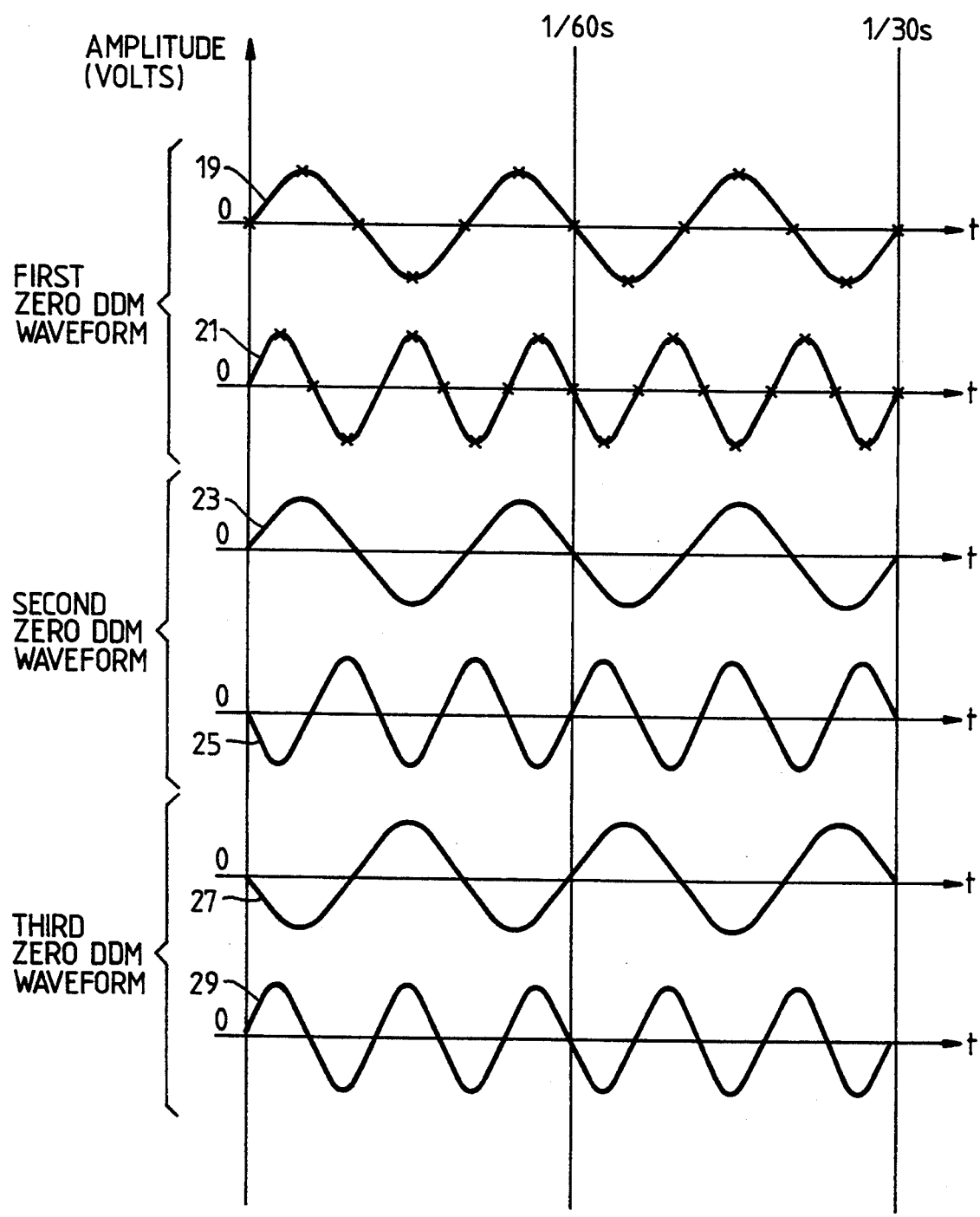
FIG. 3 is a graph of various waveforms present in the operation of circuit of FIG. 1.

Referring also to FIG. 3, the look-up table 15 of the first DDS 1 stores 1/30 sec., the repeating period, of a first zero DDM waveform comprising the superposition of 90 Hz and 150 Hz sine waveforms 19, 21 of the same amplitude. The look-up table 15 of the second DDS 3 stores 1/30 sec., the repeating period, of each of second and third alternatively selectable zero DDM waveforms. The second comprises the superposition of a 90 Hz sine waveform 23 in phase with waveform 19 of the first zero DDM waveform and a 150 Hz sine waveform 25 phase reversed (180 degrees out of phase) with respect to waveform 21 of the first zero DDM waveform, the waveforms 23, 25 being of the same amplitude. The third comprises the superposition of a 90 Hz sine waveform 27 phase reversed with respect to waveform 19 of the first zero DDM waveform and a 150 Hz sine waveform 29 in phase with waveform 21 of the first zero DDM waveform, the waveforms 27, 29 being of the same amplitude.

In operation of the waveform generator to test an ILS, to generate a zero DDM waveform, i.e. a waveform wherein the 90 Hz and 150 Hz components have the same amplitude, the variable attenuator 5 is adjusted so as to reduce to zero any waveform (i.e. the second or third zero DDM waveforms) provided by the second DDS 3. The output O/P of the waveform generator thus comprises the first zero DDM waveform provided by the first DDS 1 comprising the superposition of 90 Hz and 150 Hz waveforms of the same amplitude.

To generate a non-zero DDM waveform wherein the modulation depth of the 90 Hz component is 0.1% larger than that of the 150 Hz component, the second DDS 3 is set so as to produce the second zero DDM waveform, i.e. the zero DDM waveform comprising the superposition of the 90 Hz waveform 23 in phase with the 90 Hz waveform 19 of the first zero DDM waveform produced by the first DDS 1 and the 150 Hz waveform 25 phase reversed with respect to the 150 Hz waveform 21 of the first zero DDM waveform. The variable attenuator 5 is adjusted so as to reduce the amplitude of the second zero DDM waveform to 0.5% that of the first zero DDM waveform. In the summing circuit 7 since the 90 Hz components of the first and second zero DDM waveforms are in phase they will add, whereas the 150 Hz components will subtract since they are 180° out of phase. Thus, the summing circuit 7 will increase the modulation depth of the 90 Hz component of the first zero DDM waveform by 0.05% and reduce the modulation depth of the 150 Hz component of the first zero DDM waveform by 0.05%. Thus, the output O/P of the waveform generator will comprise a non-zero DDM waveform wherein the modulation depth of the 90 Hz component is 0.01% larger than that of the 150 Hz component.

Production of other non-zero DDM waverforms wherein the amplitude of the 90 Hz component is larger than that of the 150 Hz component, i.e. non-zero DDM waveforms wherein the modulation depth of the 90 Hz component is less than or greater than 0.1% larger than that of the 150 Hz component, is achieved by appropriate adjustment of the variable attenuator 5.

Production of non-zero DDM waveforms wherein the amplitude of the 150 Hz component is larger than that of the 90 Hz component is achieved by setting the second DDS 3 so as to produce the third zero DDM waveform i.e. the zero DDM waveform comprising the superposition of the 90 Hz waveform 27 phase reversed with respect to the 90 Hz waveform 19 of the first zero DDM waveform produced by the first DDS 1 and the 150 Hz waveform 29 in phase with the 150 Hz waveform 21 of the first zero DDM waveform. As in the case of the production of a non-zero DDM waveform with 90 Hz dominance, in the case of 150 Hz dominance the degree of dominance is controlled by the variable attenuator 5.

In the waveform generator described above by way of example both the first and second DDs 1,3 produce zero DDM waveforms and not non-zero DDM waveforms. Thus, the D/A converters 17 of the first and second DDSs 1,3 need not have the very fine resolution of, and as good a linearity as, the D/A converter of the aforementioned prior art waveform generator. Further, the production by the waveform generator described above by way of example of the zero DDM waveform and the non-zero DDM waveforms with varying degrees of 90 Hz and 150 Hz dominance is achieved with the storing of only three waveforms, viz. the first, second and third zero DDM waveforms, as compared to the many waveforms of the prior art waveform generator.

It will be noted that the total modulation depth of the waveforms provided by the waveform generator described by way of example will remain constant since in the production of the non-zero DDM waverforms the amount by which the depth of the in phase component is increased equals that by with the 180° out of phase component is reduced. As mentioned in the introduction this is an important requirement of the test waveforms.

In a modification of the waveform generator described by way of example the storing of the second or third zero DDM waveform in the look-up table 15 of the second DDS 3 is dispensed with, and a switched inverter added to the second DDS 3 to invert the output of the D/A converter 17 of the second DDS 3. Thus, if for example the second zero DDM waveform only is stored in the look-up table 15, inversion by the switched inverter will provide the third zero DDM waveform. Similarly, if the third is stored inversion will provide the second.

In an alternative modification of the waveform generator described by way of example the storing of the second or third zero DDM waveform in the look-up table 15 of the second DDS 3 is dispensed with, and the second or third, as the case may be, zero DDM waveform provided by the second DDS 3 advancing by 1/60 of a second, half the repeating period, the zero DDM waveform stored thereby. With reference to FIG. 3 it can be seen that after 1/60 sec. the 90 Hz and 150 Hz components of the second zero DDM waveform have the same relative phase as the 90 Hz and 150 Hz components of the third zero DDM waveform at t=0. Similarily, after 1/60 sec. the components of the third have the same phase as the components of the second at t=0.

I claim

1. A waveform generator suitable for use in the testing of instrument landing systems comprising: first generator means for generating digitally a first waveform comprising the superposition of a second waveform of a first frequency and a third waveform of a second frequency; second generator means for generating digitally a fourth waveform comprising the superposition of a fifth waveform comprising a phase reversed version of one of said second and third waveforms of the frequency of said one of said second and third waveform and a sixth waveform in phase with and of the frequency of the other one of said second and third waveforms; and means for combining said first and fourth waveforms thereby to produce a waveform.

2. A generator according to claim 1 further comprising variable attenuator means for attenuating the amplitude of said fourth waveform and wherein said means for combining comprises a summing circuit for summing said first and fourth waveforms.

3. A generator according to claim 1 wherein said second and third waveforms have the same amplitude, said fifth and sixth waveforms have the same amplitude, and said first and second generator means each comprises direct digital synthesiser means including a digital to analogue converter whereby the output of the direct digital synthesiser means is in analogue form.

4. A generator according to claim 1 wherein said second generator means selectively generates a first type fourth waveform wherein said one waveform is said second waveform and a second type fourth waveform wherein said one waveform is said third waveform.

5. A generator according to claim 3 wherein said second generator means selectively generates a first type fourth waveform wherein said one waveform is said second waveform and a second type fourth waveform wherein said one waveform is said third waveform.

6. A generator according to claim 5 wherein the direct digital synthesiser means of said second generator means includes a look-up table in which is stored said first and second type fourth waveforms.

7. A generator according to claim 5 wherein the direct digital synthesiser means of said second generator means includes a look-up table in which is stored said first type fourth waveform, said second generator means generating said second type fourth waveform by the synthesiser means of the second generator means advancing in time said first type fourth waveform.

8. A generator according to claim 5 wherein the direct digital synthesiser means of said second generator means includes a look-up table in which is stored said first type fourth waveform, and said second generator means includes a switched inverter for inverting the analogue output of the digital to analogue converter of the second generator means, said second generator means thereby generating said second type fourth waveform.

9. A generator according to claim 1 wherein said first frequency is 90 Hz and said second frequency is 150 Hz.

10. A generator according to claim 6 wherein said first frequency is 90 Hz and said second frequency is 150 Hz.

11. A generator according to claim 10 wherein said second generator means generates said second type fourth waveform by the synthesiser means of the second generator means advancing said first type fourth waveform by 1/30 second.

* * * * *